United States Patent
Silvey

[15] 3,695,123
[45] Oct. 3, 1972

[54] SAW CHAIN GRINDING MACHINE

[72] Inventor: Elmer R. Silvey, Route 1, Box 138, Eagle Point, Oreg. 97524

[22] Filed: Oct. 7, 1971

[21] Appl. No.: 187,422

Related U.S. Application Data

[63] Continuation of Ser. No. 41,783, June 5, 1971, abandoned, which is a continuation of Ser. No. 704,789, Feb. 12, 1968, abandoned.

[52] U.S. Cl. ..................................... 76/43, 76/25 A
[51] Int. Cl. ............................................ B23b 63/16
[58] Field of Search .............. 76/37, 40, 42, 43, 25 A; 51/125

[56] References Cited

UNITED STATES PATENTS

| | | | |
|---|---|---|---|
| 2,811,874 | 11/1957 | Rethoret | 76/40 |
| 2,824,468 | 2/1958 | Nielsen | 76/40 |

FOREIGN PATENTS OR APPLICATIONS

| | | | |
|---|---|---|---|
| 632,837 | 1/1928 | France | 76/43 |
| 29,765 | 6/1919 | Norway | 76/40 |

Primary Examiner—Harold D. Whitehead
Attorney—Stephen W. Blore et al.

[57] ABSTRACT

A grinding wheel is mounted on a machine base, and a pair of saw chain holders disposed on opposite sides of the grinding wheel are also mounted on the base. The holders are urged toward the grinding wheel by a spring and are moved away from the grinding wheel by pull cables operated by foot pedals. A turnscrew assembly is rotatably supported on the base and has right and left hand threads on opposite ends thereof on which are threadedly mounted stop fingers arranged such that by adjustment of one of the stop fingers for selectively locating its respective holder with relation to the grinding wheel, the other stop finger is simultaneously adjusted so that the other holder is positioned in precisely the same spaced position as the first mentioned holder but on the opposite side of the grinding wheel. A releasable solenoid operated hold-down lever for the saw chain is provided on each holder, and these levers are released when the foot pedals are depressed, such being accomplished by means of switches in the circuit to the solenoids and arranged for engagement by the foot pedals.

16 Claims, 8 Drawing Figures

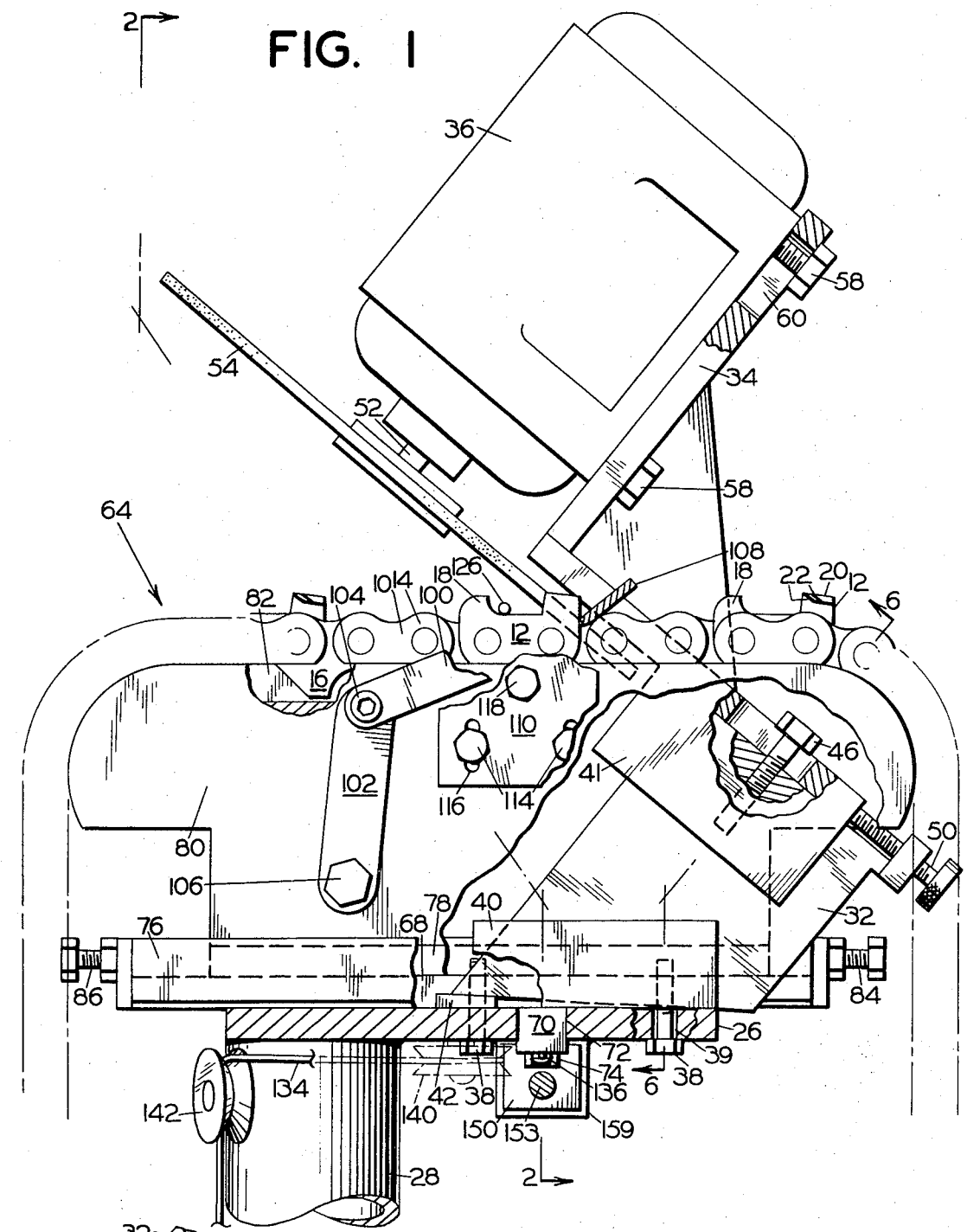

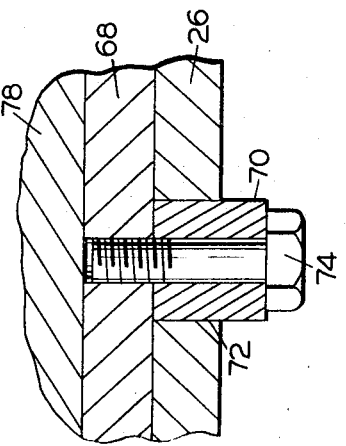

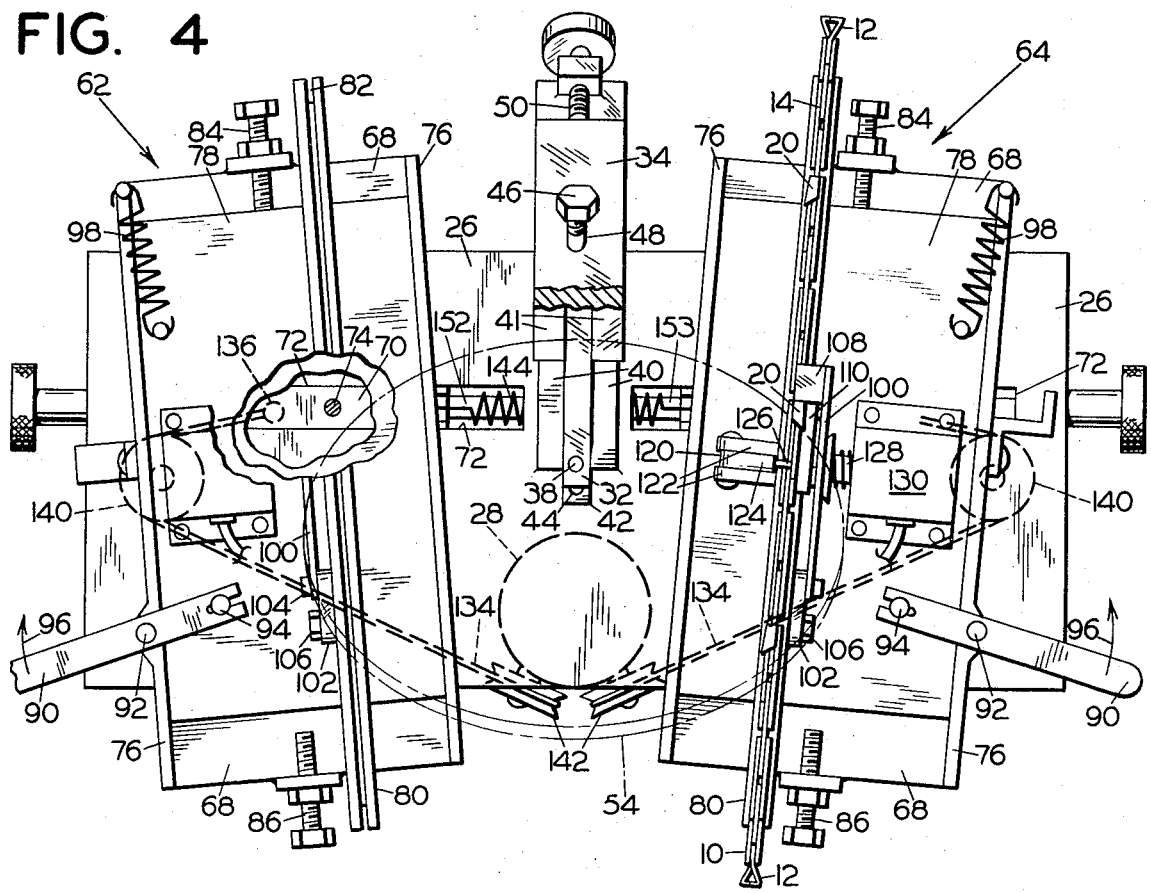
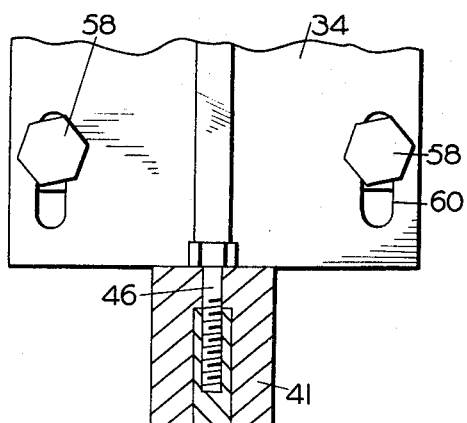
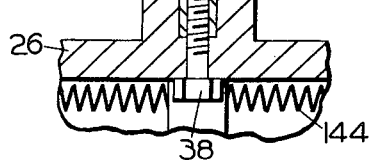

SAW CHAIN GRINDING MACHINE

CROSS REFERENCE TO RELATED APPLICATIONS

This application is a continuation of my copending application Ser. No. 41,783 filed June 5, 1971, which was in turn a continuation of my application Ser. No. 704,789 filed Feb. 12, 1968, now both abandoned.

BACKGROUND OF THE INVENTION

This invention relates to saw chain grinding machines.

A great majority of saw chains now in use have oppositely directed cutter elements on alternate cutter links. Since alternate cutter elements are faced in opposite directions, grinding operations on a chain must of course be accomplished from such opposite directions. In prior art devices, such as in U.S. Pat. No. 3,071,026, grinding machines for the present purpose have been provided which employ a grinder wheel capable of angular adjustment and positioning to effect grinding of the left and right hand cutter elements. Such prior devices employ reference or guide marks to locate the grinding wheel in its two positions.

In order for a saw chain to cut smoothly and rapidly, the right and left hand cutter elements must be ground uniformly throughout the length of the chain. Uniform grinding of the right and left hand cutter elements by the prior art devices is dependent upon a proper moving of the machine from one setting to the other, whereby obviously if the operator does not precisely place the grinder in its proper position a poor sharpening operation will result.

SUMMARY OF THE INVENTION

According to the applicant's invention and comprising an important objective thereof, there is provided a pair of saw chain holders on opposite sides of a grinder wheel, the said holders being associated with novel means such that when stop means for one of the holders is adjusted for accomplishing proper grinding of the cutter links which face in one direction, stop means top means for the other holder is automatically adjusted to accomplish identical grinding of the cutter links which face in the opposite direction, thus producing uniform grinding of all the cutter links regardless of the direction which they face.

Additional objects of the present invention are to provide a pair of chain saw holders for a structure of the type described wherein said stop means therefor are mounted on connected turnscrews having right and left hand threads and arranged such that both stop means are adjusted simultaneously to provide identical settings for their respective holders; to provide such a pair of holders which have a novel association with a grinder wheel wherein a first relative movement between the grinder wheel and the holders is employed to position the peripheral edge of the grinder wheel within the space between the cutter element and depth gauge of a cutter link on the holders and a second relative movement between the grinder wheel and holder is employed to cause engagement of the cutter link with the grinding wheel; to provide hold down means on said holders arranged to anchor a cutter link thereon and also including retracting means which are arranged to simultaneously move the holders away from the grinding wheel and release the hold-down means; and also to provide an arrangement of holders and operating means therefor which are convenient to operate.

The invention will be better understood and additional objects and advantages will become apparent from the following description taken in connection with the accompanying drawings which illustrate a preferred form of the device.

BRIEF DESCRIPTION OF THE DRAWINGS

In the drawings:

FIG. 1 is an elevational view, partly in section, of the saw chain grinding machine of the present invention, this view being taken on the line 1—1 of FIG. 2;

FIG. 2 is a cross sectional view taken on the offset line 2—2 of FIG. 1;

FIG. 3 is an enlarged fragmentary sectional view taken on the line 3—3 of FIG. 2;

FIG. 4 is a top plan view of the grinding machine, this view being partly broken away;

FIG. 5 is a fragmentary sectional view taken on the line 5—5 of FIG. 2;

FIG. 6 is a fragmentary sectional view taken on the offset line 6—6 of FIG. 1;

FIG. 7 is an enlarged fragmentary sectional view taken on the line 7—7 of FIG. 2; and FIG. 8 is a fragmentary elevational view, reduced in size with relation to the other views, and showing support means for the grinding machine.

DESCRIPTION OF THE PREFERRED EMBODIMENT

With particular reference to the drawings, the present grinding machine is designed to sharpen saw chains 10, FIGS. 1 and 4. The chain comprises a plurality of chisel cutter links 12 joined by side plates 14. Cutter links 12 have inwardly extending projections 16, FIG. 1, which as is well known serve to guide the saw chain around the saw bar on the power unit. Each of the cutter links has a depth gauge 18 and a cutter element 20. The cutter element includes angular front beveled surfaces 22.

With reference first to FIGS. 1, 2 and 4, the machine of the present invention includes a machine base or table 26 supported in a substantially horizontal plane by suitable means, such as by a pedestal 28 on a foot or base 30, FIG. 8. Secured longitudinally to the base at one end of the latter and centrally between the sides is an upstanding plate-like arm 32, FIGS. 1, 2, 4 and 6, to which is secured a right angle bracket 34 which supports a motor 36. Arm 32 angles rearwardly on the base 26, and is secured to the base by a pair of screws 38 projecting freely up through enlarged apertures 39 in the base and threadedly engaged with the arm. Lateral stability for the arm 32 is provided by a pair of upturned lugs 40 integrated with the base 26 and disposed on the opposite sides of the arm, and stability for the bracket 34 on the arm 32 is provided by downturned lugs 41 on the bracket. The angular disposition of the arm 32 may be adjusted by means of a wedge 42, FIGS. 1, 4 and 5, arranged to be inserted under the forward end of the arm. Wedge 42 has a longitudinal slot 44, FIG. 4, to receive the forwardmost screw 38. The wedge 42 may be placed under either end of the arm 32 to achieve the desired angle of tilt of motor 36.

Motor bracket 34 is secured to the upper end of the arm 32 by screw 46, FIGS. 1, 4 and 6, passing freely through a slot 48 in the bracket and threadedly engaged with the arm. By means of the slot 48, the motor bracket 34 may be longitudinally adjusted, and such bracket is maintained in an adjusted position thereof by an abutment screw 50 threadedly supported on the arm 32.

Motor 36 has an output shaft 52 on which is mounted a disc shaped grinding wheel 54. The parts are arranged such that the grinding wheel 54 extends at an oblique angle for engaging cutter elements of cutter links to be sharpened, as will be explained in greater detail hereinafter. The angular disposition of the grinding wheel 54 may be changed in the one direction by suitable positioning of wedges 42 under the arm 32. In order to allow screw 38 to move with the arm 32 in its angular adjustment, apertures 39 in the base 26 through which the screws pass are enlarged relative to the diameter of the screw.

Since the bracket 34 is secured to the arm 32 by the screw and slot structure 46, 48 it is apparent that the grinding wheel 54 can be adjusted with said bracket in a direction parallel with the face surfaces of such grinding wheel. Furthermore, motor 36 is secured to its bracket 34 by screws 58 threadedly engaged with the motor and extending through extended slots 60 in the bracket, whereby adjustment of the grinding wheel may be accomplished axially of the wheel.

Comprising a part of the present grinding machine are two saw chain holders designated respectively by the numerals 62 and 64. These holders are of identical construction but reversed in their position on opposite sides of the grinding wheel. Each comprises a base plate 68, FIGS. 1–4, slidably seated on top of the machine base 26 and having a downwardly depending tongue or projection 70. The tongue 70 of the base plates 68 are disposed in grooves 72 in the base 26 which are of greater length than the tongues to permit movement of the base plates toward and away from the grinding wheel, the grooves 70 receiving the tongues in a close sliding fit for stabilized support of the base plates 68 on the table but yet allowing the adjustable movement mentioned. Tongues 70 and base plates 68 are separate members, as shown in detail in FIG. 3, and are secured together by single fastening screws 74 projecting freely through the tongues 70 and threadedly engaging the base plate 68. By first loosening the screws 74 the base plates 68 can be rotatably adjusted relative to the table, and upon tightening the screws the base plates are secured in such adjusted position. As will be seen hereinafter, rotative positioning of the base plates with relation to the grinding wheel is desirable in positioning the chain at a desired lateral angle of grinding.

Each of the base plates 68 has upwardly extending rails or projections 76 on each side thereof. These rails extend longitudinally of the machine and form guides for longitudinally slidable carriages 78 each having an upwardly extending bar or plate 80 provided with a longitudinal groove 82 along its top and ends for receiving the inward projections 16 of the saw chain. With reference to FIGS. 1 and 4, base plates 68 have end abutment screws 84 and 86 which are disposed in the path of movement of the carriages 78 and serve to limit slidable movement of the carriages for controlling the travel of the carriage in a grinding operation.

The carriages are adapted to have forced movement in one direction, namely toward the abutment screw 86, as seen in FIGS. 1 and 4, and such movement is accomplished by a manually operable hand lever 90, FIGS. 2 and 4, pivotally mounted intermediate its ends, as by means of a pivot pin 92, on the base plate 68. One end of the lever projects over a portion of the carriage 78 and has a slot and pin connection 94 with the carriage whereby upon pivotal movement of hand lever 90 in the direction of arrow 96, FIG. 4, the carriage is forced toward the abutment screw 86. The carriages are automatically returned upon release of their respective hand levers 90 to a position in abutment with screws 84 by tension springs 98, FIG. 4, connected between the carriages and the base plates 68.

Although the grooves 82 in the bars 80 hold the saw chain in a somewhat stable position, it is desired to use hold-down means to anchor the chain securely when grinding. One of such holding means comprises a latch finger 100, FIGS. 2 and 4, pivotally attached to the upper end of a link 102, FIGS. 1 and 4, as by means of a pivot pin 104, and the link 102 is secured at its lower end to the bar 80 by means of a fastening screw 106. The screw 106 upon selected loosening and tightening thereof permits rotative adjustment of the link 102 for selective positioning of the latch finger 100. Latch finger 100 extends along one side of the bar and has an angled latch plate 108 on its free end secured transversely thereto. This latch plate is selectively angled in the longitudinal direction of the bar 80 such that when the saw chain 10 is moved to the left as viewed in FIG. 1 it will ride over the depth gauge and cutter element of a cutter link and the forward edge of said plate will catch behind the cutter link and anchor the chain positively against retracting movement. A cutter link is illustrated in a latched position in FIG. 1 in that it is anchored against right hand movement by latch plate 108.

Second holding means are provided for holding the saw chain on each of the bars 80, and such second holding means comprises a stabilizing plate or anvil 110, FIGS. 1, 2 and 4, having angular tongue 112 at its upper end directed inwardly toward the chain and arranged to engage one side of the cutter link carrying the cutter element to be ground. Plate 110 is secured to the chain supporting bay 80 by a pair of screws 114 passing freely through vertically elongated slots 116 in the lower portion of the plate and threadedly engaged in the bar 80. Located upwardly in the plate 110 and threadedly engaged in a suitable tapped bore therein is a screw 118 the inner end of which abuts against the side surface of the bar 80. By suitable operation of the screws 114 and 118, the plate 110 is adapted to be secured in a selected angular position to dispose the front end of the tongue 112 in a plane to provide backing support for a cutter link on the saw chain which is having the cutter element thereof ground. Stabilizing plate 110 is disposed on the outside of the bars 80 so as to be disposed on the opposite side of the cutter element from the grinding wheel. With reference now particularly to FIGS. 2 and 4, third holding means are provided which serve to hold the saw chain firmly downwardly against the top grooved portions of the bars 80. Each of such third holding means comprises an upstanding lever 120 pivotally connected intermediate its ends on the bar 80 by lugs 122, such lever being mounted on the opposite side of the bar from the stabilizing plate 110. Lever 120 has an angled upper portion 124 terminating in a tip end 126 which is arranged, upon certain pivotal movement of lever 120, to seat on the top edge of a side plate 14 of the saw chain opposite the cutter link during grinding of the cutter element on such cutter link. An engaging and holding position of the tip end 126 of the lever is shown in FIG. 1. The lower end of 120 is connected to the plunger 128 of a solenoid 130 by means of a link 132 extending through an aperture 133 in the bar 80. Solenoid 130 is secured to the carriage 78 and is of a type such that the plunger 128 is projected forcefully outwardly by spring pressure in the normal or deenergized condition thereof. When the solenoid is energized however the plunger thereof is retracted and the tip end 126 is raised off the link of the chain.

Each of the holders 62 and 64 has means for pulling them outwardly away from the grinding wheel in order to free the chain from the grinding wheel when installing or removing the chain or when adjusting it along the bar 80 for positioning cutter links to be sharpened. Such means comprises a pull cable 134 for each holder which as best seen in FIGS. 1, 2 and 4 is connected at one end, by suitable means 136, to the underside of tongue 70 and at its other end to a foot treadle 138 on the base 30, FIG. 8. Pull cable 134 passes over a first pulley 140 secured in a vertical axis position to the underside of table 26 and over a second pulley 142 secured in a horizontal axis position on the pedestal 28. The parts are arranged such that upon downward pivotal movement of a foot treadle 138, the base plate 68 to which it is connected is pulled outwardly away from the grinding wheel. Inward return movement of the base plates 68 is accomplished by a tension spring 144 connected, by means of eyes 146, between the facing ends of the two base plates 68. Spring 144 is of sufficient strength to provide for rapid return of the base plates 68 from their outer position and furthermore is of sufficient strength to hold such base plates in a rigid position resisting outward forces which may be applied in the grinding operation.

Mounted on the base underneath each foot treadle 138 is a switch 148, FIG. 8, which is in the electric circuit to respective solenoids 130. Switches 148 are normally open wherein the solenoids are deenergized and are closed upon engagement by the foot treadles, whereby when said foot treadles are depressed for the purpose of pulling the base 68 away from the grinding wheel, the switches 148 are closed so that solenoids 130 are energized to retract their plungers and raise the hold down tips 126 off the saw chain. Such operation will be described in greater detail hereinafter.

The inward traveling movement of the base plates 68 under the action of the spring 144 is controlled by a pair of stop fingers 150, FIGS. 2 and 7, threadedly supported on individual turnscrews 152 and 153 extending from opposite sides of the machine and journaled at their outer ends in downturned ears 154 on the table 26. The inner ends of the turnscrews project into respective, oppositely directed apertures 156 in a double headed insert 157 rotatably supported in an aperture 158 in a depending bracket 159 integrated with the table 26. Insert 157 has set screws 160 for each turnscrew 152 and 153 which holds the latter normally against rotation but which may be loosened to permit individual adjustable rotation of said turnscrews, for a reason to be described. For purposes of assembly, insert 157 is constructed of two parts connected by a nipple 161. Bracket 159 has an aperture 162, FIG. 5, through which the spring 144 freely extends, and stop fingers 150 are slotted at 163, FIG. 7, to also freely receive the said spring.

One of the turnscrews 152, 153 has a left-hand thread and the other turnscrew has a right-hand thread. Since the two turnscrews are locked together for unitary rotation by insert 157 and set screws 160 and since they have opposite threads, the stop fingers 150 are adjustably moved toward each other when the turnscrew assembly is rotated in one direction and are adjustably moved away from each other when the said turnscrew assembly is rotated in the opposite direction. Thus, it is apparent that in adjusting one of the stop fingers to a precise position for locating the base plate 68 and the saw bar 80 in a position for grinding, as held toward the grinder by the spring 144, the other base plate 68 is identically positioned with relation to the grinding wheel when it abuts its stop finger. Thus, opposite facing cutting elements on the chain cutter links are provided with identical faces and edges even though the chain has to be moved from the one holder to the other. Turnscrews 152 and 153 have knobs 164 on their outer ends for easy adjustment from either side of the machine.

For adjusting the stop fingers to their precisely symmetrical positions with relation to their respective saw holding bars 80, either initially or any time thereafter, one or both set screws 160 are temporarily loosened to allow individual movement.

When one of the holders 62 or 64 of the machine is being used, it is desired that the base plate 68 of the other holder be locked in a position such that its bar 80 and other structure are outwardly spaced from the grinding wheel. For this purpose, angled latch fingers 166 are pivotally secured to the outer side of the base plates 68 by pivot means 168. These latch fingers are adapted to engage the outer edge of the table so that when in a downturned position in engagement with said outer edge they prevent inward movement of the base plate. Thus, the other or unlocked base plate 68 can be moved toward and away from the grinding wheel without moving the other base plate. Preferably, a tight or frictional pivot connection 168 is provided so that the latch fingers 166 will stay in an unlatched position when so turned.

OPERATION

In the operation of the present grinding machine it is first desirable that suitable positioning of the grinding wheel be made, both to its angular or oblique relation and its axial position, as well as its position along the plane of its face surfaces. Such adjustments are suitably made by means of the wedge 42 under the arm 32, the screw 58, and screw 46. Each of the holders is precisely symmetrically located with relation to the grinding wheel such that any adjustment of the grinding wheel serves as an adjustment for both holders.

A saw chain 10 is installed on one of the bars 80 for first sharpening teeth faced in one direction, the stop fingers 150 first being adjusted to achieve the desired lateral penetration of the grinding wheel in the cutter links. Before placing the chain on the one bar, the foot treadle associated with that particular holder is depressed which causes the holder to back away from the grinding wheel and also to energize the respective solenoid 32 to raise the hold down finger 126. While the finger 126 is released, the chain is placed on the bar and moved to the left, FIG. 1, to a point where the latch plate 108 had ridden over the top of a cutter link and has engaged the trailing edge of such link. The chain is thus anchored positively against any retracting movement, and in addition is precisely located such that the grinding wheel will have the same engagement longitudinally with all the cutter links. The foot treadle 138 can then be released to allow the spring 144 to bring the holder to its inward position for grinding and to deenergize the solenoid whereby the hold down finger 126 engages the cutter link. When the solenoid is deenergized, its plunger returns to normal position with sufficient force to cause the fingers 126 to slam down on the cutter link and firmly anchor the said link. In such grinding operation, it is assumed that the stabilizing plate 110 has been suitably adjusted to engage the surface of the cutter link carrying the cutter element being ground and hold it against any lateral movement on the side opposite that side engaged by the grinding wheel. It is thus apparent that the cutter link carrying the cutter element to be ground is anchored against any retractive movement by the latch plate 108, against any lateral horizontal movement on the opposite side of the grinding wheel by the stabilizing plate 110, and against any traveling whatsoever by the hold down finger 126. The position of latch plate 108 is readily adjusted by first loosening the holding screw 106 for the link 102 and tightening it when the proper position has been attained.

In the arrangement of the holder, and the anchored position of the saw chain thereon thus far described, the cutter element of the cutter link to be ground has been moved such that the grinding wheel projects into the space between the cutter element 20 and the depth gauge 18 but is not as yet in engagement with the grinding wheel. To accomplish the grinding, the operator moves the carriage 78 to the left as viewed in FIG. 1, or as viewed in FIG. 4 toward the abutment screw 86, whereby the grinding wheel is engaged by the cutter element to grind the two cutting faces 22 of the cutter element. Movement of the carriage 78 is accomplished by the hand lever 90. The parts are so arranged, including a selected setting of abutment screws 86 that when the carriages are stopped by said abutment screws the cutter elements have advanced a desired distance into the grinding wheel. As soon as the hand levers 90 are released their springs 98 return the carriages to their normal positions in abutment with screws 84.

After the first tooth has been ground, the treadle 138 for that side of the machine is depressed to withdraw the holder and raise the hold down finger 126. The chain is then adjusted to bring the next cutter link which faces in that same direction into place wherein the latch plate 108 engages therebehind. The treadle 138 is then released and the grinding operation repeated. The steps are repeated until all the teeth facing in the one direction are sharpened.

Thereupon, the chain is transferred to the opposite holder and by the same process of steps just described, the cutter links having their cutting faces extending in the opposite direction are sharpened. Since the machine has precise symmetrical construction of the two holders with relation to the grinding wheel and with other settings, such as the abutment screws 86 and stop fingers 150, all the cutter links will receive uniform sharpening, thus providing a well balanced and most efficient cutting action by the saw chain.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A grinding machine for sharpening saw chains of the type wherein cutter links thereon have cutter elements facing in opposite directions, comprising:
   a base,
   a rotatable grinding wheel supported on said base,
   a pair of saw chain holders on said base disposed in spaced relation on opposite sides of said grinding wheel and being arranged to hold a saw chain in position for grinding the cutter elements thereof,
   said two saw chain holders being arranged to support cutter links of the chains in identical positions on opposite sides of said grinding wheel whereby oppositely facing cutter elements are arranged to be uniformly ground upon transferring the saw chain from one holder to the other,
   means supporting said holders on said base for movement toward and away from said grinding wheel,
   and adjustment means associated with said two holders arranged such that upon adjustable positioning of one of said holders the other of said holders is similarly positioned with relation to the opposed edge of said grinding wheel to accomplish said uniform grinding of oppositely facing cutter elements.

2. The saw chain grinding machine of claim 1 wherein said means supporting said holders for adjustable movement comprise movable carriages.

3. The saw chain grinding machine of claim 1 wherein;
   said means supporting said holder for adjustable movement comprising movable carriages,
   and including means connected between said carriages and said base arranged to rotatably adjust said carriages in said base to position cutter links on a chain supported in the holders at selected angles relative to the grinding wheel.

4. The saw chain grinder of claim 1 including;
   spring means urging said holders toward each other,
   and retracting means arranged to move said holders away from said grinding wheel.

5. The saw chain grinder of claim 1 including;
   releasable hold down means on said holders,
   and retracting means arranged simultaneously to move said holders away from said grinding wheel and release said hold down means.

6. The saw chain grinder of claim 1 wherein said adjustment means comprises:
   a turnscrew assembly having right and left hand threads on opposed ends thereof, and a pair of stop means identically positioned on respective of said turnscrew assembly, said stop means being positioned in the path of respective holders for accomplishing the said similar positioning of the two holders with relation to opposed edges of said grinding wheel.

7. The saw chain grinder of claim 1 wherein said adjustment means comprises:

a turnscrew assembly having right and left hand threads on opposed ends thereof, a pair of stop means identically positioned on respective threaded ends of said turnscrew assembly, said stop means being positioned in the path of respective holders for accomplishing the said similar positioning of the two holders with relation to opposed edges of said grinding wheel, and means biasing said holders inwardly toward their respective stop means.

8. The saw chain grinder of claim 1 wherein said adjustment means comprises:

a turnscrew assembly having right and left hand threads on opposed ends thereof, a pair of stop means identically positioned on respective threaded ends of said turnscrew assembly, said stop means being positioned in the path of respective holders for accomplishing the said similar positioning of the two holders with relation to opposed edges of said grinding wheel, said turnscrew assembly extending to opposite sides of said machine whereby adjustment thereof can be accomplished from either side of the machine.

9. The saw chain grinding machine of claim 1 including means connected between said holders and said base arranged to rotatably adjust said holders on said base to position cutter links on a chain supported in the holders at selected angles relative to the grinding wheel.

10. The saw chain grinder of claim 5 wherein;

said releasable hold down means comprises solenoid means, lever means pivotally supported on said holders and arranged in one pivot position thereof to engage the cutter link to anchor the same and in another pivoted position to be disengaged from the cutter link to release the same, means connecting said lever means with said solenoid means, said retracting means upon moving said holders away from said grinding wheel simultaneously operating said solenoid means to release said lever means from the cutter link.

11. The saw chain grinder of claim 5 wherein;

said releasable hold down means comprises solenoid means, lever means pivotally supported on said holders and arranged in one pivot position thereof to engage the cutter link to anchor the same and in another pivoted position to be disengaged from the cutter link to release the same;

means connecting said lever means with said solenoid means, said retracting means including pedal means operative when depressed to move said holders away from said grinding wheel, and a switch in the circuit to said solenoid means arranged for engagement by said pedal means in the depressed position of the latter, said switch being arranged to operate said solenoid means to its release position when engaged by said pedal.

12. The saw chain grinder of claim 5 including:

a pedestal supporting said base, spring means urging said holders toward each other, said releasable hold down means comprising solenoid means, lever means pivotally supported on said holders and arranged in one pivoted position thereof to engage the cutter link to anchor the same and in another pivoted position to be disengaged from the cutter link to release the same, means connecting said lever means with said solenoid means, said retractable means including pedal means at the lower portion of said pedestal arranged when depressed to move said holders away from said grinding wheel, and a switch in the circuit to said solenoid means arranged for engagement by said pedal means in the depressed position of the latter, said switch being arranged to operate the solenoid means to its released position when engaged by said pedal.

13. A saw chain grinding machine for sharpening saw chain having drive links and also side links including right and left cutter links spaced along said chain, each cutter link having a chisel cutter element and a depth gauge with a space between said cutter element and said depth gauge, said machine comprising:

a horizontally extending base structure, grinding means including a disc shaped grinding wheel having a peripheral edge for grinding the cutter elements of both said right and left cutter links, means on said base structure for supporting said grinding wheel above said base structure and for rotating said grinding wheel including means for maintaining said rotating wheel in a central location on said base structure with the axis of rotation of said wheel inclined downwardly and forwardly of said machine and with said wheel at an oblique angle to the horizontal during the grinding of both the left and right cutter elements of said saw chain, a saw chain holder mechanism supported on said base structure in a position at the right side of said grinding means to hold said chain for grinding the cutter elements of said right cutter links and a similar saw chain holder mechanism supported on said base structure in a corresponding position at the left side of said grinding means to hold said chain for grinding the cutter elements of said left cutter links, each of said saw chain holder mechanisms including holder means for holding a selected cutter link of said saw chain at a position adjacent but spaced from said edge of said wheel with the depth gauge of said selected cutter link positioned forwardly of said machine with respect to the cutter element of said selected cutter element, and means for causing a first relative movement between said holder means and said grinding wheel in a first direction to position said edge of said grinding wheel in said space of said selected cutter link and out of contact with the cutter element of said selected cutter link and means for thereafter causing a second relative movement between said holder means and said grinding wheel in a direction to engage and grind the cutter element of said selected cutter element with said grinding wheel.

14. The saw chain grinding machine of claim 13 in which:
each said saw chain holder mechanism includes a base member mounted on said base structure for movement in a direction laterally of said machine toward said grinding means to position said edge of said grinding wheel in said space of said selected cutter link,
and said holder means is mounted on said base member for movement in a direction forwardly of said machine to engage and grind the cutter element of said selected cutter element with said grinding wheel.

15. The saw chain grinding machine of claim 13 in which;
each said saw chain holder includes an upwardly extending horizontally disposed saw chain support member having a groove in its upper surface extending forwardly and rearwardly of said machine for receiving and fitting lower portions of said drive links with said side links resting on said upper surface,
and includes means carried by said holder for holding said selected cutter link against rearward movement during grinding of the cutter element of said selected cutter link,
and also includes a hold down means having a portion resiliently urged against said saw chain intermediate the length of said selected cutter link to hold said selected cutter link securely in said holder means during said grinding of said selected cutter link.

16. The saw chain grinding mechanism of claim 15 in which;
said machine include means for moving said saw chain holder means and said grinding wheel away from each other after grinding of said selected cutter element and means for moving said portion of said hold down means away from said saw chain to release said saw chain when said holder means and grinding wheel are moved away from each other.

* * * * *